United States Patent
Shannon et al.

(10) Patent No.: US 11,767,384 B2
(45) Date of Patent: Sep. 26, 2023

(54) GAS PHASE POLYETHYLENE COPOLYMERS

(71) Applicant: ExxonMobil Chemical Patents Inc., Baytown, TX (US)

(72) Inventors: Porter C. Shannon, Seabrook, TX (US); Handel D. Bennett, Houston, TX (US); Nathaniel B. Guy, Baytown, TX (US); Daniel G. O'Neil, Houston, TX (US); James L. Schulze, Humble, TX (US); Michael G. Tribo, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 376 days.

(21) Appl. No.: 17/091,217

(22) Filed: Nov. 6, 2020

(65) Prior Publication Data

US 2021/0147589 A1 May 20, 2021

Related U.S. Application Data

(60) Provisional application No. 62/935,500, filed on Nov. 14, 2019.

(51) Int. Cl.
| | |
|---|---|
| *C08F 210/02* | (2006.01) |
| *C08J 5/18* | (2006.01) |
| *C09K 3/10* | (2006.01) |
| *C08F 210/14* | (2006.01) |

(52) U.S. Cl.
CPC ........... *C08F 210/02* (2013.01); *C08F 210/14* (2013.01); *C08J 5/18* (2013.01); *C09K 3/10* (2013.01); *C08F 2800/10* (2013.01); *C08J 2323/08* (2013.01); *C09K 2200/062* (2013.01)

(58) Field of Classification Search
CPC .................................................. C08F 210/02
See application file for complete search history.

(56) References Cited

U.S. PATENT DOCUMENTS

| | | | |
|---|---|---|---|
| 3,321,545 A | 5/1967 | Rigney et al. | |
| 4,330,501 A * | 5/1982 | Jones ................. | B29C 48/10 425/72.1 |
| 4,500,681 A * | 2/1985 | Shulman .............. | C08L 23/10 525/227 |
| 4,831,000 A * | 5/1989 | Miro .................... | C08F 10/00 526/116 |
| 5,227,552 A | 7/1993 | Chang et al. | |
| 5,395,471 A * | 3/1995 | Obijeski ............. | C08F 10/02 156/244.11 |
| 5,461,182 A | 10/1995 | Hellring et al. | |
| 5,585,530 A | 12/1996 | Gough et al. | |
| 5,674,342 A * | 10/1997 | Obijeski ............. | C08G 83/003 264/171.23 |
| 6,492,475 B1 | 12/2002 | Egashira et al. | |
| 6,867,277 B2 | 3/2005 | Iseki | |
| 6,932,592 B2 | 8/2005 | Farley et al. | |
| 7,125,933 B2 | 10/2006 | German et al. | |
| 7,125,946 B2 | 10/2006 | Iseki et al. | |
| 7,902,417 B2 | 3/2011 | Goldman et al. | |
| 7,968,659 B2 | 6/2011 | Chai | |
| 8,242,220 B2 | 8/2012 | Chai | |
| 8,653,193 B2 | 2/2014 | Van Den Bossche et al. | |
| 9,175,119 B2 | 11/2015 | Pannier et al. | |
| 9,249,286 B2 | 2/2016 | Joseph | |
| 9,493,591 B2 | 11/2016 | Malakoff | |
| 9,963,525 B2 | 5/2018 | Ishihama et al. | |
| 10,066,036 B2 | 9/2018 | Ishihama et al. | |
| 10,066,037 B2 | 9/2018 | Ishihama et al. | |
| 2005/0255264 A1 * | 11/2005 | Maziers ............. | C08K 5/005 428/35.7 |
| 2018/0201705 A1 | 7/2018 | Desportes et al. | |

FOREIGN PATENT DOCUMENTS

| | | |
|---|---|---|
| CN | 105820280 A | 8/2016 |
| CN | 106674400 | 11/2019 |

OTHER PUBLICATIONS

Haibach, M. C., et al. (2012); "Alkane Methathesis by Tandem Alkane-Dehydrogenation-Olefin-Metathesis Catalysis and Related Chemistry"; Accounts of Chemical Research, (Mar. 8, 2012), vol. 45, pp. 947-958.

Goldman, A. S., et al. (2006); "Catalytic Alkane Methathesis by Tandem Alkane Dehydrogention-Olefin Metathesis", M. Science (Apr. 14, 2006), vol. 312, 257-261.

Wang, D., et al. (2015); "The Golden Age of Transfer Hydrogenation", American Chemical Society, Chemical Reviews, vol. 115, pp. 6621-6686.

* cited by examiner

*Primary Examiner* — Irina Krylova
(74) *Attorney, Agent, or Firm* — ExxonMobil Technology and Engineering Company-Chemicals

(57) ABSTRACT

Polyethylene copolymers with a structure that provides improved film properties are provided. The copolymers can have a density of about 0.905 to about 0.911 g/cm$^3$. The copolymers can also have a DRI/I2 ratio of about 0.0008 to about 0.060, an I2 value of about 0.6 to about 3.8 dg/min, and an I21 value of about 8 to about 57 dg/min. The copolymers having those properties can be produced by introducing ethylene and at least one other olefin comonomer to a single reactor at a comonomer/ethylene mole ratio of about 0.02 to about 0.03 and polymerizing at a temperature of about 76.7° C. to about 80.6° C. and a pressure of about 1,724 kPa to about 2,413 kPa. The copolymers can be used to make films having a 21 mol % O$_2$ transmission rate of about 150 to about 200 cc/100 in$^2$/24 hr. and hot tack seal initiation temperatures of about 65° C. to 80° C.

6 Claims, 3 Drawing Sheets

GAS PHASE POLYETHYLENE COPOLYMERS

CROSS-REFERENCE TO RELATED APPLICATION

This application claims the benefit of U.S. Provisional Application 62/935,500 filed Nov. 14, 2019 entitled "Gas Phase Polyethylene Copolymers", the entirety of which is incorporated by reference herein.

FIELD

Embodiments of the present invention generally relate to polyethylene copolymers, and more particularly polyethylene copolymers, also known as very low density polyethylene (VLDPE) copolymers or plastomers with structure demonstrating improved film properties and methods for making same.

BACKGROUND

Polyethylene copolymers are used in a variety of products and applications. The density and flow properties of the copolymer usually dictate its end uses and applications. The process for making the copolymer, whether it be solution, slurry, gas phase or other, as well as the catalyst system employed in the process greatly impact the density and properties of the copolymer.

In gas phase polymerization processes, Ziegler-Natta ("ZN") catalysts, for example, have been able to produce low density polyethylene copolymer films with high tensile strength, impact strength, tear resistance, film stiffness and can be drawn down to thin gauges. In molding applications, conventional ZN-based copolymers are known to provide excellent mold ability, high stiffness, fast molding cycles and low warpage. These copolymers also typically have low taste and odor and offer excellent crack resistance and toughness over a broad temperature range. End-use applications typically include food containers, dish pans, tumbled lids, and crates.

Metallocenes have been known to provide low density polyethylene copolymer products with a higher level and improved balance of properties as compared to conventional ZN-catalyzed PE copolymers. Copolymers produced from metallocene catalysts can also possess outstanding toughness, clarity and improved processability compared to conventionally catalyzed copolymers. In addition, metallocene catalysts have been known to have comparative polymer molecular structure, allowing independent manipulation of molecular weight distribution (MWD) and long chain branching.

Polyethylene copolymers having improved rheological or flow properties exhibit better processability when extruded to form end use products. The presence of long chain branching (LCB) in low density polymers can lead to improved flow properties. A rheological property known as the Dow Rheology Index (DRI) can be used to indicate the degree of long chain branching of a polymer copolymer. Another well-known rheological property is the Melt Flow Index (MI), which measures the ease of melt of a thermoplastic polymer. The processability of polymer copolymers can be determined by finding the DRI/MI ratio. The lower the ratio, the better the balance between the degree of long chain branching and the flowability of a polymer copolymer. It is therefore desirable to produce low density polyethylene copolymers having lower DRI/MI ratios.

Polyethylene copolymers are particularly useful in food packaging materials. Oxygen ($O_2$) in the air can cause deterioration of food and promote the growth of aerobic micro-organisms. In order to extend the shelf life of food, polyethylene copolymers are needed that would provide an excellent barrier to $O_2$.

References of potential interest in this regard include: KR 101740149 B1; KR 101689456 B1; US 2018/0201705; U.S. Pat. Nos. 6,932,592; 6,492,475; 6,867,277; 7,125,946; 7,968,659; 8,242,220; 8,653,193; 9,175,119; 9,493,591; 9,963,525; 10,066,036; 10,066,037.

SUMMARY

Copolymers of ethylene and at least one other comonomer having a density in the range of about 0.905 to about 0.911 g/cm$^3$ and methods for making same are provided. The copolymers exhibit very good processability as indicated by having a Dow Rheology Index (DRI)/Melt Index (I2) ratio of about 0.0008 to about 0.0600, a first Melt Index (I2) of about 0.1 to about 5.0 dg/min, and a second Melt Index (I21) of about 1.3 to about 90.0 dg/min. The copolymers having those properties can be made by introducing ethylene and at least one other comonomer to a single reactor at a comonomer/ethylene mole ratio of about 0.02 to about 0.03 and polymerizing the ethylene and the other comonomer at a temperature of about 76.7° C. to about 81.1° C. and a pressure of about 1,724 kPa to about 2,413 kPa.

The foregoing copolymers can be used to make films, which serve as a very good barrier to $O_2$ as indicated by having a 21 mol % $O_2$ transmission rate of about 150 to about 200 cc/100 in$^2$/24 hr. The films also have a hot tack seal initiation temperature of about 65° C. to about 80° C., which improves the quality of the films.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
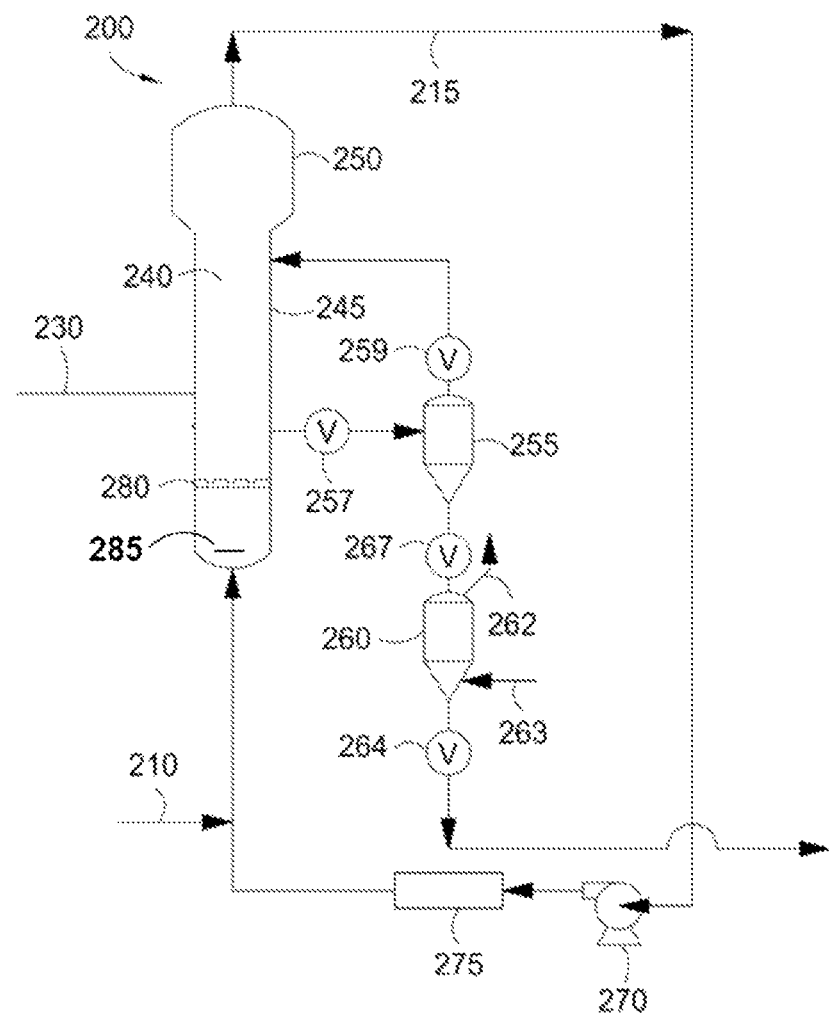
FIG. 1 depicts a flow diagram of an illustrative gas phase system that can be used in accordance with one or more embodiments provided herein.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case, does not include any other component to a level greater than 3 wt %.

Unless otherwise indicated, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

Low density copolymers of ethylene and one or more other olefins (also known as "polyethylene copolymers") are disclosed herein that have significantly improved physical properties. The copolymers can have densities in the range of about 0.905 to about 0.912 grams/centimeters cubed (g/cm$^3$), preferably in the range of about 0.907 to about 0.911 g/cm$^3$, and most preferably in the range of about 0.908 to about 0.910 g/cm$^3$. "About" as used herein in the context of density may include +/−0.001 g/cm$^3$ (e.g., 0.905 density may include 0.904-0.906 in some embodiments). The polyethylene copolymers can further have first Melt Index (I2) values of about 0.1 to about 5.0 decigrams/minute (dg/min), preferably about 0.4 to about 3.4 dg/min, and most preferably about 1.4 to about 2.4 dg/min. The polyethylene copolymers can further have second Melt Index (I21) values of about 1.3 to about 90.0 dg/min, preferably about 5.0 to about 60.0 dg/min, and most preferably about 18.0 to about 43.0 dg/min. The copolymers can further have DRI/I2 ratios in the range of about 0.0008 about 0.0600, preferably in the range of about 0.001 to about 0.060, and more preferably in the range of about 0.007 to about 0.028. It has been surprisingly and unexpectedly discovered that the low density polyethylene copolymers described herein exhibited improved processability compared to other low density polyethylene copolymers.

Advantageously, films made from the polyethylene copolymers described herein possess significantly improved properties. According to various embodiments, films having a thickness of about 1 mil can have 21 mole (mol) % $O_2$ transmission rates of about 150 to about 200 cubic centimeters/100 squared inches/24 hour period (cc/100 in$^2$/24 hr.). The 21 mol % $O_2$ transmission rates of the 1 mil films can preferably be in the range of about 160 to about 200 cc/100 in$^2$/24 hour and more preferably in the range of about 170 to about 190 cc/100 in$^2$/24 hr. Films having such low $O_2$ transmission rates can form a good barrier to $O_2$ and thus can be used in food packaging to help extend the shelf life of food. In further embodiments, the films also can have a hot tack seal initiation temperature of less than about 85° C., preferably less than about 80° C., and more preferably less than about 75° C. In yet further embodiments, the films can have a hot tack seal initiation temperature in the range of about 65° C. to about 80° C., preferably in the range of about 67° C. to about 78° C., and more preferably in the range of about 70° C. to about 75° C. The ability to use lower seal initiation temperatures during packaging formation advantageously results in improved package quality.

The copolymers of ethylene and one or more other olefins, as described herein, can be or can include one or more copolymers, including terpolymers, having ethylene-derived monomer units and one or more other olefin comonomer units. The amount of ethylene derived units in the copolymer can range from a low of about 92.5 mol % or 93.0 mol % to a high of about 97.5 mol %, 97.0 mol %, or 96.8 mol %. Also, the amount of comonomer derived units in the copolymer can range from a low of about 2.50 mol %, about 3.00 mol %, or about 3.25 mol % to a high of about 7.50 mol %, about 7.00 mol %, or about 6.75 mol %. The foregoing mole percentages are based on a combined amount of ethylene derived units and comonomer derived units.

Examples of suitable comonomers include α-olefins such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins and α-olefins having one or more $C_1$-$C_3$ alkyl branches or an aryl group. Specific examples include but are not limited to propylene; 3-methyl-1-butene; 3,3-dimethyl-1-butene; 1-pentene; 1-pentene with one or more methyl, ethyl, or propyl substituents; 1-hexene with one or more methyl, ethyl, or propyl substituents; 1-heptene with one or more methyl, ethyl, or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Preferred comonomers include propylene, 1-butene, 1-pentene, 4-methyl-1-pentene, 1-hexene, 1-octene and styrene. A particularly preferred comonomer is 1-hexene.

The Dow Rheology Index (DRI) described above was developed by S Lai and G. W. Knight to characterize the rheological behavior of substantially linear ethylene polymers (ANTEC '93 Proceedings, Insite™ Technology Polyolefins (ITP)—New Rules in the Structure/Rheology Relationship of Ethylene & 01efin Copolymers, New Orleans, La., May 1993). It expresses a polymer's "normalized relaxation time as the result of long chain branching". In S. Lai et al; (ANTEC '94, Dow Rheology Index (DRI) for Insite™ Technology Polyolefins (ITP): Unique Structure-Processing Relationships, pp. 1814-1815), the DRI is defined as to the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = [365000(\tau_0/\eta_o) - 1]/10]$$

where $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency (CO), e.g., 0.01 to 100 rads/second) as described in U.S. Pat. No. 6,114,486, the entirety of which is incorporated by reference herein, with the following generalized Cross equation:

$$\eta^*(\omega) = \eta_o/[1+(\omega \cdot \tau_0)^n]$$

where $\eta$ is the power law index of the material, $\eta^*(\omega)$ and CO are the measured complex viscosity and applied frequency data respectively. Dynamic rheological measurements are carried out according to ASTM D 4440, on a dynamic rheometer (e.g., ARES rheometer by TA Instruments) with 25 mm diameter parallel plates in a dynamic mode under an inert atmosphere. More details regarding how to determine the DRI can be found in U.S. Pat. No. 9,175,119, and in particular at column 13, line 56 through column 15, line 12, which description is incorporated by reference herein in its entirety.

The aforementioned Melt Flow Indices can be found by measuring the mass of polyethylene copolymer flowing in ten minutes through a capillary of a specific diameter and length by a pressure applied via prescribed gravimetric weights for alternative prescribed temperatures and is expressed in grams of polymer per 10 minutes of duration of the test. MI2 refers to ASTM D 1238 (190° C./2.16 kg), and MI21 refers to ASTM D 1238 (190° C./21.6 kg).

"Hot tack seal initiation temperature" refers to the temperature at which hot tack testing in accordance with ASTM F1921 (method B) demonstrates hot tack strength of at least 8 N. In a hot tack test, the film sample is heated to a given temperature and pressed against itself (sealant-side to sealant-side); force required to pull the film apart at the given temperature is measured and recorded as the hot tack strength. Furthermore, heat seal testing can confirm the seal initiation temperature as determined by hot tack testing. Heat seal testing involves hot-sealing the film sample at a given temperature, then conditioning at approximately room temperature, followed by pulling the seal apart and measuring the force required to pull the seal apart. The force to pull the seal apart is plotted against the temperature at which the seal was formed (prior to conditioning). More details of these tests may be found in Table 8 (Test Procedures).

The films provided herein can be a mono-layer or multi-layer film. In an embodiment, the film can include at least one layer, whether the only layer of the mono-layer film or a layer of a multi-layer film, comprising of from about 5 wt % to about 95 wt % of the ethylene-based copolymer based on the total weight of the film layer. Preferably, that film layer has a thickness of about 7 micrometers (μm) to about 200 μm; and more preferably 10 μm to about 150 μm; and more preferably 10 μm to about 100 μm; and more preferably 20 μm to about 90 μm; and more preferably 15 μm to about 75 μm. If part of a multi-layer film structure, the film layer makes up at least 5% of the total film thickness, or at least 10%, or at least 15%, or at least 17%, or at least 20%, or at least 22% of the total film thickness.

To facilitate discussion of different multi-layer film structures, each layer of a film can be denoted as a different letter, such as A, B, C, D, E, etc. depending on the number of distinct layers. Where a film includes more than one layer such as more than one A layer, one or more prime symbols (', ", ''', etc.) are appended to the A symbol (i.e. A', A", etc.) to indicate layers of the same type (conventional or inventive) that can be the same or can differ in one or more properties, such as chemical composition, density, melt index, thickness, etc., within the range of these parameters defined herein. Finally, the symbols for adjacent layers are separated by a slash (/). Using this notation, a three-layer film can be denoted A/B/A or A/C/A. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film. When a multilayer film has two or more of the same layers, such as two or more B layers for example, the B layers can be the same, or can differ in thickness, chemical composition, density, melt index, CDBI, MWD, additives used, or other properties.

In at least one specific embodiment, the film is an A/B/A multi-layer film where each "A" layer ("skin layer") is the same or different and located on either side of the "B" layer ("core layer"). The ratio of thickness of the core layer and skin layers is generally preferred to be in the range of 1/1/1-1/4/1, more preferably 1/1.5/1-1/3/1, even more preferably 1/1.5/1-1/2.5/1, most preferably the ratio of core layer to skin layers will be 1/2/1, where the first and third numbers are understood to represent the skin layers and the middle number is representative of the core layer.

The thickness of each layer, and of the overall film, is not particularly limited, but is determined according to the desired properties of the film. Individual film layers can have a thickness of about 1 to 1,000 microns (μm), more typically about 5 to 100 μm. Those skilled in the art will appreciate that the thickness of individual layers for multilayer films can be adjusted based on desired end use performance, resin or copolymer employed, equipment capability and other factors.

A typical total thickness of a multi-layer film can range from about 10 to about 100 µm. In one or more embodiments, the total film thickness can range from about 0.5 µm to about 250 µm. In one or more embodiments, the total film thickness can range from a low of about 10, 50, or 100 µm to a high of about 120, 150, or 200 µm. In one or more embodiments, the total film thickness can range from about 25 µm to about 50 µm.

For example, the multi-layer films can have an optical gauge of about 0.1 mil to about 70 mil; about 0.3 mil to about 55 mil; about 0.5 mil to about 30 mil; or about 1 mil to about 10 mil, wherein a "mil" is known in the art as being one thousandth of an inch. Optical gauge can be measured using any method or device known in the art, such as a laser micrometer. For example, the optical gauge can be measured using a Beta LaserMike Model 283-20 available from Beta LaserMike USA.

In one or more embodiments, multilayer films having any of the following illustrative structures can be used:
(a) two-layer films, such as A/B and B/B';
(b) three-layer films, such as A/B/A', A/A'/B, A/B/B', B/A/B', B/B'/B", A/B/A, and A/C/A;
(c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'";
(d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/BB"/A', B/A/A'/B'/B", B/A/B'/A'/B", B/A/B'/B"/A', A/B/B'/B"/B'", B/A/B'/B"/B'", B/B'/A/B"/B'", B/B'/B"/B'"/B"", and A/B/C/B/A; and similar structures for films having six, seven, eight, nine or more layers. It should be appreciated that films having still more layers can be used.

FIG. 1 depicts a flow diagram of an illustrative gas phase system 200 that can be used to make the polyethylene copolymers disclosed herein. The system 200 can include a single reactor 240 in fluid communication with one or more discharge tanks 255 (only one shown), surge tanks 260 (only one shown), recycle compressors 270 (only one shown), and heat exchangers 275 (only one shown). For simplicity and ease of description, embodiments of the invention will be further described in the context of a single reactor train.

In one or more embodiments, the reactor 240 can include a reaction zone 245 in fluid communication with a velocity reduction zone 250. The reaction zone 245 can include a bed of growing polymer particles, formed polymer particles and catalyst particles fluidized by the continuous flow of polymerizable and modifying gaseous components in the form of make-up feed and recycle fluid through the reaction zone 245.

Figure 2:
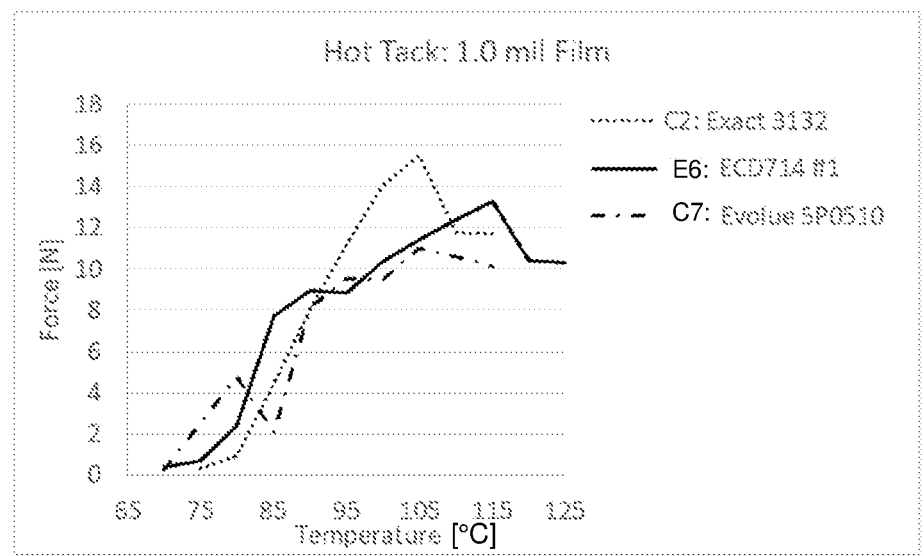
FIG. 2 is a graph of the force versus the temperature used during a hot tack test of one of the extruded polyethylene copolymer examples and two of the extruded comparative examples.

A feed stream or make-up stream 210 can be introduced into the polymerization system at any point. For example, the feed stream or make-up stream 210 can be introduced to the reactor fluid bed in the reaction zone 245 or to the expanded section 250 or to any point within the recycle stream 215. Preferably, the feed stream or make-up stream 210 is introduced to the recycle stream 215 before or after the heat exchanger 275. In FIG. 2, the feed stream or make-up stream 210 is depicted entering the recycle stream 215 after the heat exchanger ("cooler") 275.

The term "feed stream" as used herein refers to a raw material used in a polymerization process to produce the polyethylene copolymers described herein. The feed stream can include an ethylene monomer and one or more olefin comonomers, including but not limited to substituted and unsubstituted alkenes having 3 to 20 carbon atoms, more preferably 3 to 12 carbon atoms. Examples of such comonomers include but are not limited to propylene, 1-butene, 1-pentene, 4-methyl-1-pentene, 1-hexene, 1-octene, 1-decene, 1-dodecene, styrene, and derivatives thereof, with 1-hexene being preferred. The feed stream can also include non-olefinic gas such as nitrogen and hydrogen. In one or more embodiments, the feed stream can have an olefin comonomer/ethylene monomer mole ratio of from about 0.02 to about 0.03, preferably from about 0.024 to about 0.032, more preferably from about 0.026 to about 0.032. As used herein, "about" in the context of comonomer/ethylene monomer mole ratios may include ranges +/−0.005 (e.g., such that about 0.024 may in some embodiments include mole ratios within the range from 0.0235-0.0245). The feed stream can enter the reactor at multiple and different locations. For example, monomers can be introduced into the polymerization zone in various ways including direct injection through a nozzle (not shown in the drawing) into the bed. The feed stream can further include one or more non-reactive alkanes that may be condensable in the polymerization process for removing the heat of reaction. Illustrative non-reactive alkanes include but are not limited to propane, butane, isobutane, pentane, isopentane, hexane, isomers thereof, and derivatives thereof. It should be noted that in practice, measuring mole ratios of comonomer/ monomer provided to the reactor may in some instances be carried out by measuring the mole ratios in vapor overhead within the reactor. In the event there is any discrepancy between (i) mole ratios determined based on feed stream measurements and (ii) mole ratios determined based on measurements of gas overhead in the reactor, mole ratios as determined based on measurements of gas overhead in the reactor should govern, and such ratios should be considered as the molar feed ratios for purposes of this disclosure.

The fluidized bed can have the general appearance of a dense mass of moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 245, the superficial gas velocity through the bed must exceed the minimum flow required for fluidization. Preferably, the superficial gas velocity is at least two times the minimum flow velocity. Ordinarily, the superficial gas velocity does not exceed 1.52 m/sec and usually no more than 0.762 m/sec is sufficient.

In general, the height to diameter ratio of the reaction zone 245 can vary in the range of from about 2:1 to about 5:1. The range, of course, can vary to larger or smaller ratios and depends upon the desired production capacity. The cross-sectional area of the velocity reduction zone 250 is typically within the range of about 2 to about 3 multiplied by the cross-sectional area of the reaction zone 245.

The velocity reduction zone 250 can have a larger inner diameter than the reaction zone 245. As the name suggests, the velocity reduction zone 250 can slow the velocity of the gas due to the increased cross-sectional area. This reduction in gas velocity can allow particles entrained in the upward moving gas to fall back into the bed, allowing primarily only gas to exit overhead of the reactor 240 through recycle gas stream 215.

The recycle stream 215 can be compressed in the compressor 270 and then passed through the heat exchanger 275 where heat is removed before it is returned to the bed. The heat exchanger 275 can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream 215 can be returned to the reactor 240. The cooled recycle stream can absorb the heat of reaction generated by the polymerization reaction. In one or more embodiments above or elsewhere herein, condensing mode operation, such as described in U.S. Pat. Nos. 4,543,399; 4,588,790; 5,352,749; and 5,462,999, can be used to assist in heat removal from the reactor 240.

In one or more embodiments, the recycle stream 215 can be returned to the reactor 240 and to the fluidized bed through a gas distributor plate 280. A gas deflector 285 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

The catalyst or catalyst system can be introduced to the fluidized bed within the reactor 240 through the one or more injection nozzles 230. The catalyst or catalyst system is preferably introduced as pre-formed particles in one or more liquid carriers (i.e. a catalyst slurry). Suitable liquid carriers include mineral oil and liquid hydrocarbons including but not limited to propane, butane, isopentane, hexane, heptane, and octane, or mixtures thereof. A gas that is inert to the catalyst slurry such as, for example, nitrogen or argon can also be used to carry the catalyst slurry into the reactor 240. In one or more embodiments, the catalyst or catalyst system can be a dry powder. In one or more embodiments, the catalyst or catalyst system can be dissolved in the liquid carrier and introduced to the reactor 240 as a solution.

On discharge of particulate polymer product from reactor 240, it is desirable and preferable to separate fluid from the product and to return the fluid to the recycle line 215. In one or more embodiments, this separation can be accomplished when fluid and product leave the reactor 240 and enter the product discharge tanks 255 (one is shown) through valve 257, which can be a ball valve designed to have minimum restriction to flow when opened. Conventional valves 259 and 267 can be positioned above and below the product discharge tank 255. The valve 267 can allow passage of product into the product surge tanks 260 (only one is shown).

In at least one embodiment, to discharge particulate polymer from reactor 240, valve 257 can be opened while valves 259 and 267 are in a closed position. Product and fluid can enter the product discharge tank 255. Valve 259 can be opened to allow the fluid to return to the reactor 240. Valve 257 can be closed, allowing the product to settle in the product discharge tank 255. Valve 259 can then be closed. Valve 267 can be opened and any product in the product discharge tank 255 flows into the product surge tank 260. Valve 267 can then be closed. Product can then be discharged from the product surge tank 260 through valve 264. The product can be further purged via purge stream 263 to remove residual hydrocarbons (and vented at 262) and conveyed to a pelletizing system or to storage (not shown). The particular timing sequence of the valves 257, 259, 267, and 264 can accomplished by the use of conventional programmable controllers which are well known in the art.

Another preferred product discharge system which can be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor can be equipped with an adequate venting system (not shown) to allow venting the bed during start up and shut down. The reactor does not require the use of stirring and/or wall scraping. The recycle line 215 and the elements therein (compressor 270 and heat exchanger 275) can be smooth surfaced and devoid of unnecessary obstructions so as not to impede the flow of recycle fluid or entrained particles.

In one or more embodiments, the polymerization conditions used in the process for making polyethylene copolymers described herein can be selected to achieve the desired improved properties of the copolymers. More specifically, the temperatures can be in the range of a low of about 74° C., 75° C., 75.56° C., 76.7° C., or 77.2° C.; to a high of about 80.0° C., 80.6° C., or 81.1° C., with ranges from any foregoing low end to any foregoing high end also contemplated (such as about 76.7° C. to about 81.1° C., about 76.7° C. to about 80.6° C., or 77.2° C. to about 80.0° C. in various embodiments). In some embodiments, temperature can be in a range from about 75.56° C. to about 80° C. As used herein with respect to temperatures, "about" can include +/−1° C., such that in various embodiments, a temperature of, e.g., 75.56° C. may include 74.56-76.56° C. The pressures can be in the range of about 1,724 kilopascals (kPa) to about 2,413 kPa, preferably in the range of about 1,931 kPa to about 2,068 kPa, and more preferably in the range of about 1,965 kPa to about 2,034 kPa. Additional details of polymerization can be found in U.S. Pat. No. 6,627,713, which is incorporated by reference at least to the extent it discloses polymerization details.

The catalyst system can include Ziegler-Natta catalysts, chromium-based catalysts, metallocene catalysts and other single-site catalysts including Group 15-containing catalysts bimetallic catalysts, and mixed catalysts. The catalyst system can also include $AlCl_3$, cobalt, iron, palladium, chromium/chromium oxide or "Phillips" catalysts. Any catalyst can be used alone or in combination with the others.

The term "catalyst system" includes at least one "catalyst component" and at least one "activator", alternately at least one cocatalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component can include at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups is used as in the CRC Handbook of Chemistry and Physics (David R. Lide, ed., CRC Press $81^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_7$ alkyl groups, $C_2$ to $C_7$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

According to one embodiment, the catalyst can includes one or more metallocene catalyst components, also known as "metallocenes". Suitable metallocenes are generally described throughout 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999), and in particular, for use in the synthesis of polyethylene in 1 Metallocene-Based Polyolefins 261-377 (2000), each of which is incorporated herein in its entirety. The metallocene catalyst compounds as described herein can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. One particularly suitable metallocene is zirconocene containing a carbon to zirconium bond, which is commercially available from Univation Technologies, LLC under the tradename XCAT™. In one embodiment, the metallocene catalyst component can be supported on a support material and may be supported with or without another catalyst component.

The Cp ligands can be one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) can be selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

The films can be formed by any number of known lamination, extrusion, or coextrusion techniques. Any of the blown, tentered, or cast film techniques commonly used is suitable. For example, a resin composition can be extruded in a molten state through a flat die and then cooled to form a film, in a cast film process. Alternatively, the composition can be extruded in a molten state through an annular die and then blown and cooled to form a tubular, blown film, which can then be used to make sacks or slit and unfolded to form a flat film.

The extrusion temperatures, die temperatures, and chill roll temperatures are dependent on the composition of the polymeric composition employed, but will generally be within the following ranges for the compositions described herein: extrusion temperature, 170° C. to 250° C.; die temperature, 170° C. to 250° C.; and chill roll temperature, 10° C. to 65° C. The filmmaking processes can also include embossing rolls to chill and form the film.

The films can also be unoriented, uniaxially oriented, or biaxially oriented. In one or more embodiments, the multilayer films can be uniaxially or biaxially oriented. Orientation in the direction of extrusion is known as machine direction (MD) orientation. Orientation perpendicular to the direction of extrusion is known as transverse direction (TD) orientation. Orientation can be accomplished by stretching or pulling a film first in the MD followed by TD orientation. Blown films or cast films can also be oriented by a tenterframe orientation subsequent to the film extrusion process, again in one or both directions. Orientation can be sequential or simultaneous, depending upon the desired film features. For example, orientation ratios can be about three to about six times the extruded width in the machine direction and between about four to about ten times the extruded width in the transverse direction. Typical commercial orientation processes are BOPP tenter process and blown film.

In a particular film orientation embodiment, an interdigitating grooved roller assembly is used to simultaneously produce a desirable crinkled surface finish and orient the film. Such processes are described in U.S. Pat. No. 4,368, 565. In this process, the film is stretched between two interlocking grooved rollers which are able to both biaxially stretch the film and orient it.

For multiple-layer films, the materials forming each layer can be coextruded through a coextrusion feedblock and die assembly to yield a film with two or more layers adhered together but differing in composition. Coextrusion can be adapted to cast film or blown film processes. Multiple-layer films can also be formed by combining two or more single layer films using conventional lamination techniques.

Examples

The foregoing discussion can be further described with reference to the following non-limiting examples.

Polyethylene copolymers (Examples E1, E2, E3, E4, E5, and E6), according to one or more embodiments described herein, were produced by feeding 1-hexene ($C_6$) and ethylene ($C_2$) to a single gas phase reactor at the $C_6/C_2$ mole ratios shown in Table 1 below. Table 1 also depicts the process conditions used to form examples E1-E6. The feed stream also included hydrogen ($H_2$), nitrogen ($N_2$), and iso-pentane (iC5) in the amounts shown in Table 1. A fluidized catalyst bed was introduced to the reactor which contained XCAT™ zirconocene catalyst. The polymerization bed temperature used to produce the examples ranged from 168° F. (75.56° C.) to 176.0° F. (80° C.). Further, the reactor pressure ranged from 290.0 psig, to 299.7 psig. The production rate, the catalyst productivity, and the percent of the product stream that was condensed are also given in Table 1.

TABLE 1

Process Conditions for Examples E1-E6

| | | E1 | E2 | E3 | E4 | E5 | E6 |
|---|---|---|---|---|---|---|---|
| Bed Temperature | ° F. | 176 | 170 | 176.1 | 168.0 | 172.0 | 172 |
| Reactor Pressure | psig | 299.5 | 299.7 | 290.0 | 290.0 | 290.0 | 290 |
| Ethylene Concentration | mol % | 69.95 | 70.02 | 60.55 | 67.02 | 57.20 | 56.9 |
| $H_2$ Concentration | ppm | 169 | 166 | 102.3 | 359.9 | 235.0 | 235 |
| $C_6/C_2$ = Gas Ratio | mol/mol | 0.0316 | 0.0400 | 0.0260 | 0.0263 | 0.0297 | 0.0312 |
| iC5 Composition | mol % | 0 | 0 | 2.53 | 0.0 | 5.9 | 5.7 |
| $N_2$ Composition | mol % | 27.8 | 27.2 | 35.68 | 30.4 | 36.3 | 36.3 |
| Production Rate | lb/hr | 163 | 124 | 65.1 | 82.8 | 63000.0 | 58960 |
| Catalyst Productivity | lb/lb | 10501 | 15109 | 6998.8 | 9183 | 8581.0 | 8581 |
| % Condensed | wt. % | 0 | 0 | 0 | 0 | 8.0 | 6.4 |

Table 2 below shows the process conditions used to produce comparative examples of polyethylene copolymers that were further processed in the same manner as the examples shown in Table 1 (see description below). Example $C_1$ was Exceed™ 1012 sold by Exxon Mobil Corporation; examples $C_3$ and $C_4$ were made internally; example $C_5$ was Exceed™ 1018 sold by Exxon Mobil Corporation; example $C_6$ was Exceed™ 3518 sold by Exxon Mobil Corporation; and example $C_{12}$ was Exceed™ 2012 sold by Exxon Mobil Corporation.

TABLE 2

Process Conditions for Comparative Examples $C_1$, $C_3$, $C_4$, $C_5$, $C_6$, and $C_{12}$

| | | $C_1$ | $C_3$ | $C_4$ | $C_5$ | $C_6$ | $C_{12}$ |
|---|---|---|---|---|---|---|---|
| Bed Temperature | ° F. | 176.0 | 191.0 | 191.0 | 185.0 | 185.0 | 176.0 |
| Reactor Pressure | psig | 290.0 | 290.0 | 289.9 | 290.0 | 290.0 | 290.0 |
| Ethylene Concentration | mol % | 60.63 | 66.81 | 66.92 | 67.21 | 64.02 | 58.72 |
| $H_2$ Concentration | ppm | 191 | 205.6 | 69.5 | 199 | 376 | 259 |
| $C_6/C_2$ = Gas Ratio | mol/mol | 0.0280 | 0.0132 | 0.0102 | 0.0297 | 0.0256 | 0.0273 |
| iC5 Composition | mol % | 10.7 | 3.16 | 2.85 | 16.7 | 15.6 | 9.7 |
| $N_2$ Composition | mol % | 23.8 | 29.55 | 30.21 | 15.64 | 19.60 | 30.09 |
| Production Rate | lb/hr | 89100 | 64.8 | 49.6 | 96900 | 113000 | 84800 |
| Catalyst Productivity | lb/lb | 6085 | 5157 | 3128 | 6440 | 6958 | 8118 |
| % Condensed | wt. % | 16.5 | 0 | 0 | 20.6 | 23.4 | 13.0 |

The polyethylene copolymer examples (E1-E6) and various comparative examples ($C_1$, $C_2$, $C_3$, $C_4$, $C_5$, $C_6$, $C_7$, $C_8$, $C_9$, $C_{10}$, $C_{11}$, $C_{12}$, and $C_{13}$) were molded according to ASTM D4703-10a, Procedure C and then conditioned according to ASTM D618-08 for 40 hours before testing. As shown in Tables 3 and 4 below, the densities of the examples were further measured according to ASTM D1505. The names of examples $C_1$, $C_3$, $C_4$, $C_5$, $C_6$, and $C_{12}$ have already been provided above. In addition, example $C_2$ was Exact™ 3132 sold by Exxon Mobil Corporation; example $C_7$ was Evolue™ SP0510 sold by Prime Polymer Co., Ltd.; example $C_8$ was Evolue™ SP1510 sold by Prime Polymer Co., Ltd.; example $C_9$ was Evolue™ SP1520 sold by Prime Polymer Co., Ltd.; example $C_{10}$ was Elite™ 5400 sold by Dow Chemical Company; example $C_{11}$ was Dowlex™ sold by Dow Chemical Company; and example $C_{13}$ was an Affinity™ PL1880G sold by Dow Chemical Company.

In addition, I2 and I21 melt flow values were measured in accordance with ASTM D1238 for each example shown in Tables 3, 4, and 5. The DRI and DRI/I2 values for certain examples (E1-E6 and $C_1$-$C_{11}$) were also calculated as described previously. As shown in Table 3, the DRI/I2 ratios of examples E1, E2, E4, E5 were found to range from 0.007 to 0.028, which was surprisingly and unexpectedly low for polyethylene copolymers having densities in the range of 0.9036 to 0.9099 g/cm³. As such, the inventive examples exhibited very good extrusion processability.

As also shown in Tables 3, 4, and 5, the number average molecular weight (Mn), the weight average molecular weight (Mw), the size average molecular weight (Mz), and the molecular weight distributions (Mw/Mn and Mz/Mw), and complex viscosity were determined for the following examples: E1-E5; and $C_1$-$C_{11}$. See Table 8 below for a description of how the molecular weights and complex viscosity values were determined.

TABLE 3

Composition of Matter of Examples E1-E6

|  |  | E1 | E2 | E3 | E4 | E5 | E6 |
|---|---|---|---|---|---|---|---|
| $I_2$ | dg/min | 1.1 | 1.01 | 0.53 | 3.35 | 1.9 | 1.9 |
| $I_{21}$ | dg/min | 17.56 | 16.66 | 8.9 | 57.8 | 30.9 | 31.4 |
| MFR |  | 16.8 | 16.8 | 16.7 | 17.3 | 16.3 | 16.5 |
| Density | g/cc | 0.9099 | 0.9036 | 0.9066 | 0.9057 | 0.9093 | 0.9094 |
| Mn | Dalton | 61450 | 62230 | 50228 | 29852 | 34144 |  |
| Mw | Dalton | 117151 | 124029 | 126520 | 76780 | 88823 |  |
| Mz | Dalton | 184120 | 197222 | 230811 | 136861 | 159431 |  |
| Mw/Mn |  | 1.91 | 1.99 | 2.52 | 2.57 | 2.60 |  |
| Mz/Mw |  | 1.57 | 1.59 | 1.82 | 1.78 | 1.79 |  |
| Eta * $10^2$ | Pa * s | 2454 | 2457 | 3270 | 1240 | 1798 |  |
| Eta * $10^1$ | Pa * s | 5151 | 5394 | 8605 | 1976 | 3255 |  |
| Eta * $10^0$ | Pa * s | 6469 | 6932 | 12709 | 2206 | 3802 |  |
| Eta * $10^{-1}$ | Pa * s | 6791 | 7319 | 14034 | 2252 | 3919 |  |
| DRI |  | 0.019 | 0.028 | 0.045 | 0.025 | 0.017 |  |
| DRI/$I_2$ |  | 0.017 | 0.028 | 0.084 | 0.007 | 0.009 |  |
| Comonomer |  |  |  | hexene | hexene | hexene |  |
| % Ethylene | mol % |  |  | 94.3 | 93.7 | 95.0 |  |
| % Comonomer | mol % |  |  | 5.7 | 6.3 | 5.0 |  |

TABLE 4

Composition of Matter of Comparative Examples $C_1$-$C_7$

|  |  | $C_1$ | $C_2$ | $C_3$ | $C_4$ | $C_5$ | $C_6$ | $C_7$ |
|---|---|---|---|---|---|---|---|---|
| $I_2$ | dg/min | 1.07 | 1.21 | 3.55 | 0.64 | 0.99 | 3.71 | 1.14 |
| $I_{21}$ | dg/min | 16.83 | 19.23 | 59.7 | 10.7 | 15.2 | 58.9 | 21.2 |
| MFR |  | 16.8 | 16.8 | 16.8 | 16.7 | 15.4 | 15.9 | 18.6 |
| Density | g/cc | 0.9120 | 0.9036 | 0.9310 | 0.9307 | 0.9187 | 0.9196 | 0.9059 |
| Mn | Dalton | 52417 | 45363 | 21899 | 35754 | 38516 | 28212 | 34026 |
| Mw | Dalton | 123259 | 116849 | 74043 | 121139 | 106363 | 73377 | 102961 |
| Mz | Dalton | 219943 | 203052 | 141539 | 245781 | 195319 | 132310 | 206707 |
| Mw/Mn |  | 2.35 | 2.58 | 3.38 | 3.39 | 2.76 | 2.60 | 3.03 |
| Mz/Mw |  | 1.78 | 1.74 | 1.91 | 2.03 | 1.84 | 1.80 | 2.01 |
| Eta * $10^2$ | Pa * s | 2572 | 2385 | 1171 | 2928 | 2661 | 1178 | 2042 |
| Eta * $10^1$ | Pa * s | 5433 | 4950 | 1844 | 7242 | 5631 | 1761 | 4559 |
| Eta * $10^0$ | Pa * s | 6841 | 6130 | 2072 | 10543 | 7064 | 1920 | 6011 |
| Eta * $10^{-1}$ | Pa * s | 7186 | 6404 | 2121 | 11675 | 7406 | 1950 | 6412 |
| DRI |  | 0.014 | 0.016 | 0.030 | 0.064 | 0.009 | 0.009 | 0.070 |
| DRI/$I_2$ |  | 0.013 | 0.013 | 0.009 | 0.100 | 0.009 | 0.002 | 0.061 |
| Comonomer |  |  |  | hexene | hexene | hexene | hexene | hexene |
| % Ethylene | mol % |  |  | 98.5 | 98.9 | 97.3 | 96.8 | 94.1 |
| % Comonomer | mol % |  |  | 1.5 | 1.1 | 2.7 | 3.2 | 5.9 |

45

TABLE 5

Composition of Matter of Comparative Examples $C_8$-$C_{13}$

|  |  | $C_8$ | $C_9$ | $C_{10}$ | $C_{11}$ | $C_{12}$ | $C_{13}$ |
|---|---|---|---|---|---|---|---|
| $I_2$ | dg/min | 0.88 | 1.96 | 1.02 | 1.03 | 1.91 | 1.05 |
| $I_{21}$ | dg/min | 15.6 | 30.7 | 30.5 | 29.8 | 30.3 | 31.2 |
| MFR |  | 17.7 | 15.6 | 29.9 | 28.9 | 15.9 | 29.7 |
| Density | g/cc | 0.9127 | 0.9129 | 0.9164 | 0.9215 | 0.9118 | 0.9065 |
| Mn | Dalton | 33395 | 34349 | 27324 | 25796 |  |  |
| Mw | Dalton | 112009 | 87704 | 100105 | 112063 |  |  |
| Mz | Dalton | 220670 | 158012 | 253852 | 433373 |  |  |
| Mw/Mn |  | 3.35 | 2.55 | 3.66 | 4.34 |  |  |
| Mz/Mw |  | 1.97 | 1.80 | 2.54 | 3.87 |  |  |
| Eta * $10^2$ | Pa * s | 2419 | 1755 | 1533 | 1593 |  |  |
| Eta * $10^1$ | Pa * s | 5672 | 3074 | 3954 | 4146 |  |  |
| Eta * $10^0$ | Pa * s | 7675 | 3549 | 7758 | 7135 |  |  |
| Eta * $10^{-1}$ | Pa * s | 8239 | 3650 | 11062 | 8791 |  |  |
| DRI |  | 0.055 | 0.012 | 1.469 | 0.505 |  |  |
| DRI/$I_2$ |  | 0.062 | 0.006 | 1.441 | 0.491 |  |  |

TABLE 5-continued

Composition of Matter of Comparative Examples $C_8$-$C_{13}$

|  |  | $C_8$ | $C_9$ | $C_{10}$ | $C_{11}$ | $C_{12}$ | $C_{13}$ |
|---|---|---|---|---|---|---|---|
| Comonomer |  | hexene | hexene | octene | octene |  |  |
| % Ethylene | mol % | 95.9 | 96.3 | 96.7 | 97.2 |  |  |
| % Comonomer | mol % | 4.1 | 3.7 | 3.3 | 2.8 |  |  |

The polyethylene copolymer examples E5 and E6 as well as comparative examples $C_2$, $C_7$, $C_{12}$, and $C_{13}$ were further extruded into 1 mil monolayer films on an Alpine II blown film line. Blown film evaluations of the polymers were carried out on an Alpine blown film line equipped with a 160 mm monolayer die having a 90 mil die gap and a 2.5:1 BUR. Table 6 below provides details of the blown film process conditions. Various film properties were determined for each of the above examples in the machine direction (MD) and the transverse direction (TD). More specifically, these properties were the Elmendorf Tear Strength, the Dart Drop Impact, the Secant Modulus, the Tensile Strength, the Yield Strength, the Elongation at Break, the Haze, and the Gloss. The values of all of these properties are depicted in Table 7 below. Table 8 below names or describes the test methods used to obtain all the properties provided in the tables. The films of examples E5 and E6 possessed higher Elmendorf Tear Strengths, Secant Moduli, Tensile Energies, Yield Strengths, and Elongations than the films of comparative examples $C_2$, $C_7$, and $C_{13}$. Those film properties of examples E5 and E6 were comparable to those film properties of comparative $C_{12}$, which is made by Exxon Mobil Corporation. As such, the properties of the films of inventive examples E5 and E6 appeared to be better than those of competitive films.

The water transmission (ASTM F1249-13) and permeation rates and the oxygen transmission rates (ASTM D3985-17) (at 21 mol % $O_2$ and 100 mol % $O_2$) of the films of examples E5 and E6 and the films of comparative examples $C_2$, $C_7$, $C_{12}$, and $C_{13}$ were also measured. As shown in Table 7, the water transmission rates and oxygen transmission rates of the films of examples E5 and E6 were lower than those of the films of comparative examples $C_2$, $C_7$, and $C_{13}$. Thus, the films of inventive examples E5 and E6 provide improved protection against permeability by water and oxygen compared to competitive films.

TABLE 6

Film Process Conditions

|  |  | E7 | E16 | C2 | C7 | C12 | C13 |
|---|---|---|---|---|---|---|---|
| Die Diameter | mm | 160 | 160 | 160 | 160 | 160 | 160 |
| Die Gap | mil | 90 | 90 | 90 | 90 | 90 | 90 |
| BUR |  | 2.5:1 | 2.5:1 | 2.5:1 | 2.5:1 | 2.5:1 | 2.5:1 |
| FLH | inches | 34 | 34 | 42 | 39 | 32 | 37 |
| Gauge | mil | 1.0 | 1.0 | 1.0 | 1.0 | 1.0 | 1.0 |
| RPM | rpm | 50.7 | 50.7 | 54.2 | 51.6 | 50.3 | 42.6 |
| Rate | lbs/hr | 260 | 260 | 260 | 260 | 260 | 260 |
| Melt Temperature | ° F. | 422 | 422 | 448 | 438 | 423 | 413 |
| Melt Pressure 1 | psi | 5200 | 5200 | 6860 | 6380 | 5060 | 5830 |
| Melt Pressure 2 | psi | 4130 | 4130 | 5050 | 4650 | 3860 | 4390 |
| Ext Zone 1 SP | ° F. | 34 | 34 | 42 | 39 | 32 | 37 |
| Ext Zone 2 SP | ° F. | 34 | 34 | 38 | 34 | 33 | 37 |
| Ext Zone 3 SP | ° F. | 350 | 350 | 350 | 350 | 355 | 350 |
| Ext Zone 4 SP | ° F. | 370 | 370 | 370 | 370 | 370 | 370 |
| Ext Zone 5 SP | ° F. | 370 | 370 | 370 | 370 | 370 | 370 |
| Ext Zone 6 SP | ° F. | 370 | 370 | 370 | 370 | 370 | 370 |
| Ext Zone 7 SP | ° F. | 370 | 370 | 370 | 370 | 370 | 370 |
| Die Zone 1 SP | ° F. | 380 | 380 | 380 | 380 | 390 | 380 |
| Die Zone 2 SP | ° F. | 380 | 380 | 380 | 380 | 390 | 380 |
| Die Zone 3 SP | ° F. | 390 | 390 | 390 | 390 | 400 | 390 |
| Die Zone 4 SP | ° F. | 390 | 390 | 390 | 390 | 400 | 390 |

TABLE 7

Film Physical Properties

|  |  |  | E7 | E16 | C2 | C7 | C12 | C13 |
|---|---|---|---|---|---|---|---|---|
| Elmendorf Tear | MD | g/mil | 224 | 234 | 135 | 135 | 252 | 158 |
|  | TD | g/mil | 298 | 304 | 255 | 259 | 326 | 378 |
| Dart Drop Impact |  | g | 693 | 705 | 927 | 735 | 927 | 417 |
| 1% Secant Modulus | MD | psi | 11900 | 12300 | 8750 | 9310 | 14200 | 9410 |
|  | TD | psi | 12200 | 12300 | 8790 | 9670 | 14700 | 10500 |

TABLE 7-continued

Film Physical Properties

|  |  |  | E7 | E16 | C2 | C7 | C12 | C13 |
|---|---|---|---|---|---|---|---|---|
| Tensile Strength | MD | psi | 10650 | 10700 | 10900 | 11100 | 10350 | 9840 |
|  | TD | psi | 9780 | 9770 | 10500 | 10900 | 8460 | 9810 |
| Yield Strength | MD | psi | 820 | 840 | 700 | 730 | 920 | 750 |
|  | TD | psi | 780 | 800 | 600 | 640 | 910 | 675 |
| Elongation (Break) | MD | % | 510 | 510 | 430 | 430 | 530 | 440 |
|  | TD | % | 600 | 610 | 500 | 580 | 620 | 630 |
| Haze |  | % | 27.5 | 28.2 | 1.8 | 14.5 | >30 | 2.4 |
| Gloss | MD |  | 21.2 | 22.1 | 84.8 | 36.3 | 19 | 79.9 |
|  | TD |  | 20.6 | 23.6 | 84.7 | 35.2 | 16.9 | 80.8 |
| MVTR |  |  |  |  |  |  |  |  |
| Transmission | g/(m$^2$/24 hr.) |  |  | 27.1 | 27.4 | 34.3 | 23.4 | 33.7 |
| Permeation | (g-mil)/(m$^2$/24 hr.) |  |  | 26.6 | 27.5 | 34.1 | 23.7 | 31.6 |
| OTR |  |  |  |  |  |  |  |  |
| 21% O$_2$ | cc/(100 in$^2$/24 hr.) |  |  | 182 | 174 | 250 | 158 | 256 |
| 100% O$_2$ | cc/(100 in$^2$/24 hr.) |  |  | 857 | 830 | 1095 | 753 | 1219 |

TABLE 8

Test Procedures

| Test Name or Parameter Name | Method or description |
|---|---|
| Melt Index (I$_2$), High Load Melt Index (I$_{21}$) | ASTM D-1238 2.16 kg (MI) or 21.6 kg (HLMI), 190° C. |
| MFR | I$_{21}$/I$_2$ |
| Density | ASTM D1505, column density. Samples were molded under ASTM D4703-10a, Procedure C, then conditioned under ASTM D618-08 (23° ± 2° C. and 50 ± 10% relative humidity) for 40 hours before testing |
| 1% Secant Modulus | ASTM D-882, 15 mm width strip |
| Yield Strength | ASTM D-882, 15 mm width strip |
| Tensile Strength | ASTM D-882, 15 mm width strip |
| Elongation at Break | ASTM D-882, 15 mm width strip |
| Elongation at Yield | ASTM D-882, 15 mm width strip |
| Dart Drop | ASTM D-1709, Phenolic, Method A |
| Haze | ASTM D-1003 |
| Gloss, 45° | ASTM D-2457 |
| Elmendorf Tear | ASTM D1922 with conditioning for 40 hours at 23° ± 2° C. and 50 ± 10% relative humidity |
| Puncture | Modified ASTM D5748: ASTM probe was used with two 0.25 mil HDPE slip sheets. Machine Model: United SFM-1. Testing speed: 10 in/min |
| $^1$H NMR (Unsaturations) | Unsaturations in a polymer were determined by $^1$H NMR with reference to 38 MACROMOLECULES 6988 (2005), and 47 MACROMOLECULES 3782 (2014) (see $^1$H NMR description below) |
| Ethylene mol % Comonomer mol % | $^{13}$C NMR samples were dissolved in deuterated 1,1,2,2-tetrachloroethane (tce-d2) at a concentration of 67 mg/mL at 140° C. Spectra were recorded at 120° C. using a Bruker NMR spectrometer of at least 600 MHz with a 10 mm cryoprobe. A 90° pulse, 10 second delay, 512 transients, and gated decoupling were used for measuring the $^{13}$C NMR. Polymer resonance peaks are referenced to Polyethylene main peak at 29.98 ppm. Calculations involved in the characterization of polymers by NMR follow the work of J. Randall in "Polymer Sequence Determination, 13C-NMR Method", Academic Press, New York, 1977. |
| Heat Seal | Method using 1 inch film strip of 1 mil gauge, sealed at various temperatures under 73 psi (0.5 N/mm$^2$) for 1 second. Following conditioning for 40 hours at 23° ± 2° C. and 50 ± 10% relative humidity, the sealed specimen were tested in T-joint peel mode at 20 inch/min pulling speed |
| Hot tack | ASTM F1921 (method B) |
| Molecular weights and cross-fractionation | GPC-4D and CFC |
| Small Angle Oscillatory Shear (SAOS) | Test performed on an ARES G2 with 25 mm parallel plates, 2 mm gap, 190° C. and a strain in the linear viscoelastic region. Test performed on an ARES G2. |
| ETA*10$^x$ | Complex viscosity measured from SAOS at a shear rate of 10$^x$. For example, Eta*10$^2$ is the complex viscosity measured at a shear rate of 100 rad/sec. |
| Moisture Vapor Transmission Rate (MVTR) | Procedure is modified ASTM F1249-3. Modifications include two specimen per sample; five measured gauge points in test area; automatic testing temperature of 37.8° C.; and 100% relative humidity. Equipment is a Permatran W-700 manufactured by Mocon. |

TABLE 8-continued

Test Procedures

| Test Name or Parameter Name | Method or description |
|---|---|
| Oxygen Transmission Rate (OTR) | Procedure is modified ASTM D3985. Modifications include automatic test temperature of 23° C.; and 21% $O_2$ uses compressed air. Equipment is an Ox-Tran 2/21. |
| DRI | Described above. |

Figure 3:
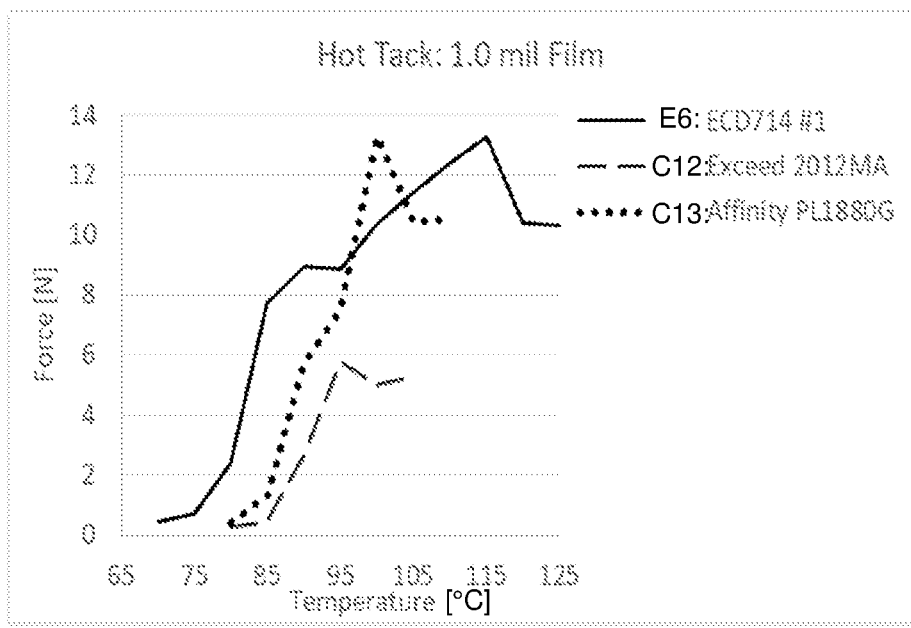
FIG. 3 is a graph of the force versus the temperature used during a hot tack test of the same extruded polyethylene copolymer example and two different extruded comparative examples as compared to FIG. 2.

The polyethylene copolymer example E6 and the comparative examples $C_2$, $C_7$, $C_{12}$, and $C_{13}$ were further subjected to hot tack testing and heat seal strength testing as described in Table 8. Turning to FIG. 2, a graph of the force versus the temperature used during the hot tack test of example E6 and comparative examples $C_2$ and $C_7$ is depicted. FIG. 3 depicts a similar graph, comparing E6 to comparative examples $C_{12}$ and $C_{13}$. E6 advantageously demonstrates superior hot-tack holding force in the 75-85° C. range as compared to $C_2$, $C_7$, $C_{12}$, and $C_{13}$, achieving a substantial degree of holding force at these lower temperatures. Since sealing is a heat-transfer-based mechanism, the achievement of robust holding force at substantially lower temperatures is very beneficial to increase throughput and decrease energy expenditure when making films and other articles from ethylene copolymers in accordance with the present disclosure.

Figure 4:
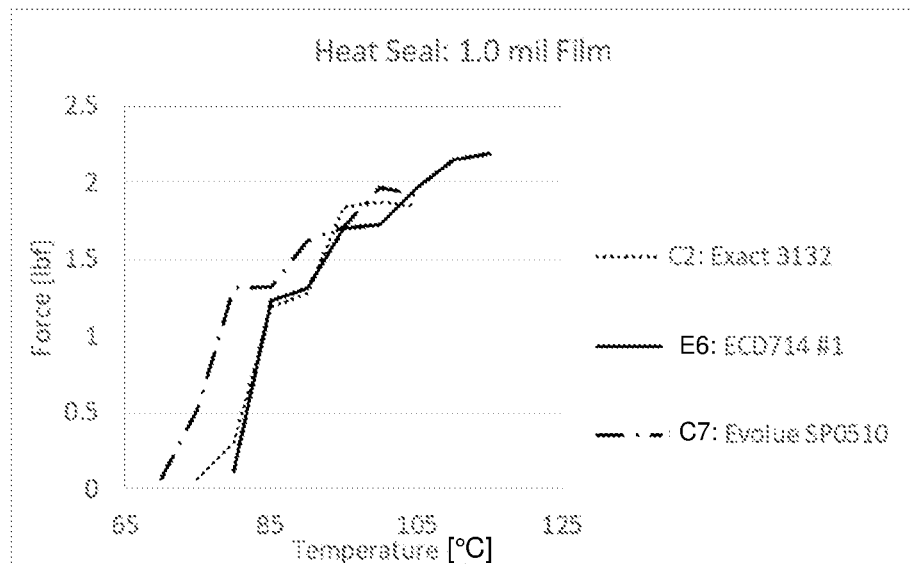
FIG. 4 is a graph of the force versus the temperature used during a heat seal strength test of one of the extruded polyethylene copolymer examples and two of the extruded comparative examples.
Figure 5:
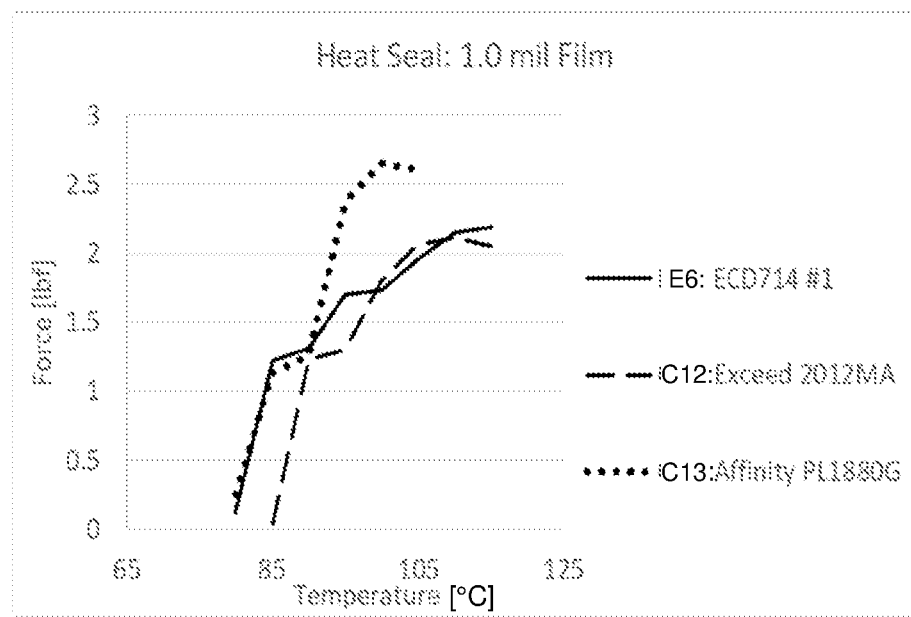
FIG. 5 is a graph of the force versus the temperature used during a heat seal strength test of the same extruded polyethylene copolymer example and two different extruded comparative examples as compared to FIG. 4.

Turning to FIG. 4, a graph of the force versus the temperature used during the heat seal strength test of example E6 and comparative examples $C_2$ and $C_7$ is shown. FIG. 5 depicts yet another graph showing the force versus the temperature used during the heat seal strength test of example E6 and comparative examples $C_{12}$ and $C_{13}$. Based on FIGS. 7 and 8, the heat seal strength performance of example E6 was similar to that of comparative examples $C_2$, $C_7$, $C_{12}$ and $C_{13}$. In sum, then, example E6 enables substantially better (lower-temperature) processing while achieving similar results in heat seal strength as compared to the incumbent solutions.

This disclosure may further include any one or more of the following non-limiting embodiments:

1. An ethylene copolymer, comprising about 92.5 mol % to about 97.5 mol % ethylene derived units; and about 2.5 mol % to about 7.5 mol % at least one other comonomer derived units, wherein the copolymer has a density of about 0.905 g/cm³ to about 0.912 g/cm³ and a Dow Rheology Index (DRI)/Melt Index (I2) ratio of about 0.0008 to about 0.0600.
2. The copolymer of embodiment 1, wherein the copolymer further has a first Melt Index (I2) of about 0.1 to about 5.0 dg/min, as measured according to ASTM D138(190° C./2.16 kg).
3. The copolymer of embodiment 1 or 2, wherein the copolymer further has a second Melt Index (I21) of about 1.3 to about 90.0 dg/min, as measured according to ASTM D138 (190° C./21.6 kg).
4. The copolymer of embodiments 1 to 3, wherein the density is about 0.907 g/cm³ to about 0.911 g/cm³.
5. The copolymer of embodiments 1 to 4, wherein the density is about 0.908 g/cm³ to about 0.910 g/cm³.
6. The copolymer of embodiments 1 to 5, wherein the DRI/I2 ratio is about 0.001 to about 0.060.
7. The copolymer of embodiments 1 to 6, wherein the DRI/I2 ratio is about 0.007 to about 0.028.
8. The copolymer of embodiments 1 to 7, wherein the at least one other comonomer is an alpha-olefin having 3 to 12 carbon atoms.
9. The copolymer of embodiments 1 to 8, wherein the at least one other comonomer is 1-hexene.
10. A process for making a copolymer of ethylene and at least one other comonomer, comprising: introducing the ethylene and the at least one other comonomer to a single reactor at a comonomer/ethylene mole ratio of about 0.02 to about 0.03; and polymerizing the ethylene and the at least one other comonomer at a temperature of about 76.7° C. to about 81.1° C. and a pressure of about 1,724 kPa to about 2,413 kPa.
11. The process of embodiment 10, wherein the at least one other comonomer is 1-hexene.
12. The process of embodiment 10 or 11, wherein the comonomer/ethylene mole ratio is about 0.024 to about 0.032.
13. The process of embodiments 10 to 12, wherein the comonomer/ethylene mole ratio is about 0.026 to about 0.032.
14. The process of embodiments 10 to 13, wherein the temperature is about 76.7° C. to about 80.6° C.
15. The process of embodiments 10 to 14, wherein the temperature is about 77.2° C. to about 80.0° C.
16. The process of embodiments 10 to 15, wherein the copolymer has a density of about 0.905 g/cm³ to about 0.912 g/cm³; and a Dow Rheology Index (DRI)/Melt Index (I2) ratio of about 0.0008 to about 0.0600.
17. A film made from the copolymer of claim 1, the film having (a) a thickness of about 1 mil; (b) a 21 mol % oxygen transmission rate of about 150 to about 200 cc/100 in2/24 hr; and (c) a hot tack seal initiation temperature of about 65° C. to about 80° C.
18. The film of embodiment 17, wherein the 21 mol % oxygen transmission rate is about 160 to about 200 cc/100 in2/24 hr.
19. The film of embodiments 17 or 18, wherein the 21 mol % oxygen transmission rate is about 170 to about 190 cc/100 in2/24 hr.
20. The film of embodiments 17 to 19, wherein the hot tack seal initiation temperature is about 67° C. to about 78° C.
21. The film of embodiments 17 to 20, wherein the hot tack seal initiation temperature is about 70° C. to about 75° C.
22. A copolymer of ethylene and at least one other comonomer made from the process of claim 10, the copolymer having: (a) a density of about 0.905 g/cm³ to about 0.912 g/cm³; and (b) a Dow Rheology Index (DRI)/Melt Index (I2) ratio of about 0.0008 to about 0.0600.
23. The copolymer of embodiment 22, wherein the copolymer further has a first Melt Index (I2) of about 0.1 to about 5.0 dg/min, as measured according to ASTM D138(190° C./2.16 kg).

24. The copolymer of embodiments 22 or 23, wherein the copolymer further has a second Melt Index (I21) of about 1.3 to about 90.0 dg/min, as measured according to ASTM D138 (190° C./21.6 kg).

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An ethylene copolymer, comprising:
    about 92.5 mol % to about 97.5 mol % ethylene derived units; and
    about 2.5 mol % to about 7.5 mol % hexene-derived units, wherein the copolymer has
        a density of about 0.905 g/cm$^3$ to about 0.911 g/cm$^3$;
        a first Melt Index (I2) of about 0.4 to about 3.4 dg/min, as measured according to ASTM D138(190° C./2.16 kg);
        a second Melt Index (I21) of about 5 to about 60 dg/min, as measured according to ASTM D138 (190° C./21.6 kg);
        a Melt flow ratio (I21/I2) of about 16 to about 17; and
        a Dow Rheology Index (DRI)/Melt Index (I2) ratio (DRI/I2) of about 0.007 to about 0.060;
    wherein the copolymer is produced by
        introducing the ethylene and the 1-hexene to a single gas phase reactor at a 1-hexene/ethylene mole ratio of about 0.02 to about 0.03, as determined by measuring moles of the 1-hexene and the ethylene in a vapor overhead of the single reactor; and
        polymerizing the ethylene and the 1-hexene at a temperature of about 75.56° C. to about 80° C. and a pressure of from 290.0 psig to 299.7 psig.

2. The copolymer of claim 1, further having a density of about 0.907 g/cm$^3$ to about 0.911 g/cm$^3$.

3. The copolymer of claim 2, having one or both of the following properties:
    (a-1) a density of about 0.908 g/cm$^3$ to about 0.910 g/cm$^3$; and
    (b-1) a DRI/I2 ratio of about 0.007 to about 0.028.

4. A film made from the copolymer of claim 1, the film having:
    (a) a thickness of about 1 mil;
    (b) a 21 mol % oxygen transmission rate of about 150 to about 200 cc/100 in$^2$/24 hr; and
    (c) a hot tack seal initiation temperature of about 65° C. to about 80° C.

5. The film of claim 4, having one or both of the following properties:
    (b-1) the 21 mol % oxygen transmission rate of 160 to 200 cc/100 in$^2$2/24 hr; and
    (c-1) the hot tack seal initiation temperature of 67° C. to 78° C.

6. The film of claim 5, having one or both of the following properties:
    (b-2) the 21 mol % oxygen transmission rate of 170 to 190 cc/100 in$^2$/24 hr; and
    (c-2) the hot tack seal initiation temperature of 70° C. to 75° C.

* * * * *